(No Model.) 2 Sheets—Sheet 1.
J. F. PANKHURST.
MARINE STEAM WINDLASS.
No. 287,050. Patented Oct. 23, 1883.
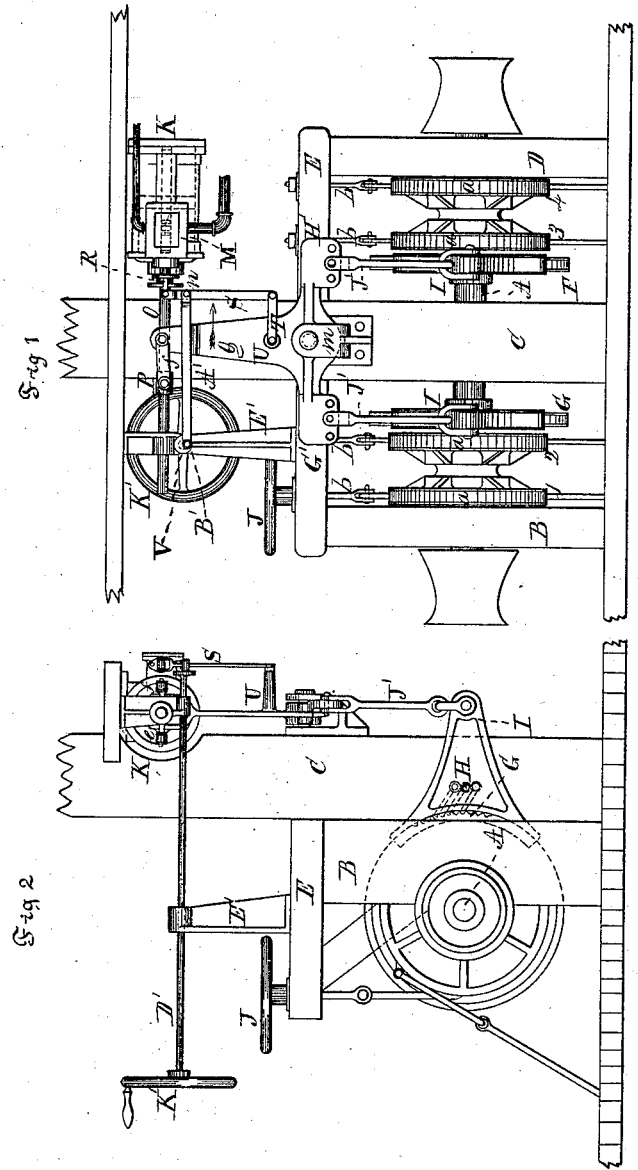
Witnesses
J. H. Burridge
George Luell
Inventor
J. F. Pankhurst
W. H. Burridge
Atty.

(No Model.)
J. F. PANKHURST.
MARINE STEAM WINDLASS.
No. 287,050. Patented Oct. 23, 1883.
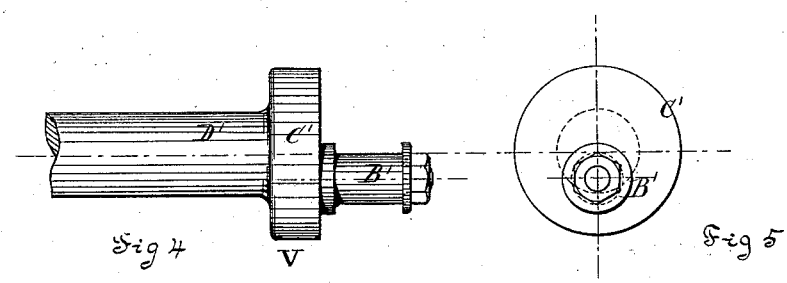
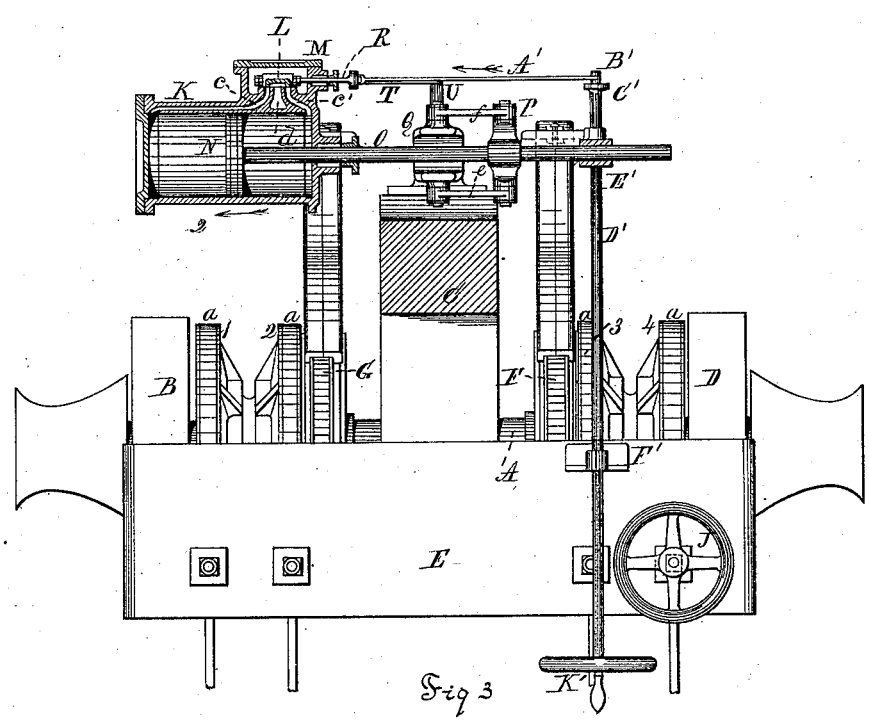

UNITED STATES PATENT OFFICE.

JOHN F. PANKHURST, OF CLEVELAND, OHIO.

MARINE STEAM-WINDLASS.

SPECIFICATION forming part of Letters Patent No. 287,050, dated October 23, 1883.

Application filed September 5, 1883. (No model.)

*To all whom it may concern:*

Be it known that I, JOHN F. PANKHURST, of Cleveland, in the county of Cuyahoga and State of Ohio, have invented new and useful Improvements in Marine Steam-Windlasses; and I do hereby declare that the following is a full and complete description of the same.

The improvement above alluded to is for operating the windlass of a vessel, and for that purpose the operative mechanism consists of a steam cylinder and piston the valve of which is actuated by a combination of levers for opening and closing the steam-ports, thereby giving motion to the piston, which, by its rod, is connected to the brake-beam of the windlass, causing it to vibrate for operating the ratchet-wheels, whereby the chain-wheel or the capstan is made to revolve, substantially as hereinafter more fully described, and illustrated in the drawings making a part of this specification, in which—

Figure 1 represents a side elevation of a windlass having applied thereto the improved mechanism for operating the same. Fig. 2 is an end elevation. Fig. 3 is a plan view, partly in section. Figs. 4 and 5 are detached sections in different positions.

Like letters of reference refer to like parts in the several views.

The windlass above referred to, consisting of the ratchet-wheels, capstan, brake, &c., forms no part of this invention; hence only a brief description thereof is given in this place.

As shown in the drawings, A represents a shaft having its bearings in a suitably-constructed frame, consisting of the uprights B, C, and D, and the cross-piece or beam E. On said shaft are secured the ratchet-wheels F and G, of which H are the pawls, secured in the yokes I. On said shaft are also the brakes 1, 2, 3, and 4, of which *a* are the bands attached to coupling-links *b*, whereby they are drawn tight around the wheels by a hand-wheel, J, for braking the action of the windlass, all of which are or may be like the combined windlass and brake in ordinary use.

The above-described ratchet-wheels are operated by the following-described mechanism: K, Figs. 1 and 3, is a steam-cylinder, of which *c* and *c'* are the induction-ports and *d* the eduction or exhaust port. L is the slide-valve in the steam-chest M. The piston, by its rod O, is connected to a cross-head, P, and by the links *e* and *f* the cross-head is attached to the arm of the brake-beam Q, for operating the same, as hereinafter described.

It will be observed that the piston-rod passes through the arm of the brake-beam, the arm being bifurcated for that purpose; hence the rod moves freely therein, as it is in no manner connected thereto. The valve-rod R is pivoted to the upper end of the lever S, Fig. 1, whereas the lower end of the lever is pivoted to an arm, T, Figs. 1 and 3. Said arm is attached to a stud, U, projecting from the side of the arm Q of the brake-beam, as seen in said Figs. 1 and 3. A' is a link connecting the lever S to a crank-pin, B', inserted in a head or wheel, and forms therewith a crank-wheel, V, terminating the end of the shaft D', having its bearings in a standard, E', and a journal-box, F'. An enlarged view of the crank-wheel is shown in Figs. 4 and 5. By means of the said wheel the link A' is given a reciprocating movement for vibrating the lever S, for a purpose presently shown.

The brake-beam above referred to is pivoted to the upright C at *m*, and to the lateral arms G' and H' thereof are connected, respectively, the yokes I of the ratchet-wheels by means of the jointed links J', which, as the brake-beam is made to vibrate, the pawls are alternately actuated for operating the ratchet wheels.

Practically the operation of the above-described mechanism is as follows: As shown in the drawings, Fig. 1, both of the induction-ports of the cylinder are closed by the valve. As above mentioned, the valve is connected to the crank-wheel V by the connecting-link A'. Now, on turning the shaft D', which is done by the hand-wheel K', the said crank will operate the valve reciprocally for opening and closing the steam-ports *c* and *c'* alternately and as rapidly as the shaft is revolved. As the link A' moves in the direction of the arrow the valve will open the port *c'*, allowing steam to enter the cylinder and drive the piston in the direction of the arrow 2. This movement of the piston causes the piston-rod to move the arm Q of the brake-beam in the direction of the arrow, thereby lifting the horizontal arm G' of the beam and at the same time depressing the arm H'. The upward action of the arm G' turns the ratchet-wheel by means of the pawls H, while the pawls of the ratchet-wheel F are moving down over its respective ratchet-wheel, to engage the teeth thereof on a reverse action of the brake-beam. Said reverse action of the beam is effected by the lever S. Thus, as the arm Q of the brake-beam moves in the direction of the arrow the lower end of the said lever S is pushed forward by the arm T, causing the upper end thereof to move in the opposite direction. (The connection n of the link A' to the lever serves as a fulcrum for the action of the lever.) The reverse movement of the lever S commences the instant the arm of the brake-beam moves, and tends to reverse the movement of the valve, causing an initial closing of the port c', and which is fully closed by the crank-wheel and the link A', which, at the same time, moves the valve so far in the opposite direction of the arrow as to open the steam-port c and the exhaust-port by the continuous rotative movement of the shaft D'. Steam by this means is admitted to the opposite side of the piston and drives it in the reverse direction, thereby causing the arm Q of the brake-beam to move in a reverse direction of the arrow, which, as a consequence, depresses the arm G' and pulls upward the arm H', which engages the pawls with the ratchet-wheel F and rotates it as did the pawls the wheel G. As the arm Q of the brake-beam moves in the opposite direction of the arrow, as above mentioned, the lower end of the lever S moves in the same direction, causing the upper end of the lever to move the valve, thereby effecting an initial closing of the steam-port c, which will be wholly closed by the crank-wheel as the shaft D' is continued to be revolved, and at the same time opening the exhaust-port and the induction-port c', allowing steam to again drive the piston in the direction of the arrow, as in the first-mentioned instance, and so on alternately, the piston is reciprocally operated for actuating the brake-beam, thereby producing a vibratory action of the arms G' and H', which, as above said, operate the ratchet-wheels by the pawls H, producing a continued revolving of the windlass.

From the above description of the construction and operation of the machine, it will be obvious that the movement of the valve for opening and closing the steam-ports is effected and controlled by the crank-wheel and the co-operation therewith of the lever S, the tendency of which is to close the induction steam-ports, while the action of the aforesaid crank-wheel and link opens them to produce the reciprocal action of the piston, which in turn vibrates the brake-beam, that it may actuate the pawls and ratchet-wheels for raising the anchor or for warping around the vessel.

The opening and closing of the ports c and c' for operating the piston will be the same whether the shaft D' is revolved in one direction or in the other; hence no special care need be taken to turn the hand-wheel K' in one particular direction to effect a proper and full action of the mechanism for operating the windlass. A continued turning of the hand wheel and shaft produces a continued action of the windlass.

Instead of the shaft D' and crank-wheel being used for operating the steam-valve, a lever may be employed for the same purpose; but the crank-wheel is preferred.

What I claim as my invention, and desire to secure by Letters Patent, is—

1. In combination with the brake-beam Q of a windlass, a steam cylinder and piston the rod of which is connected to the said beam by a cross-head, and links e and f, for operating said beam, substantially as described, and for the purpose set forth.

2. In combination with the valve of the steam-cylinder and brake-beam, the lever S, arm T, and link connecting said lever to the crank-wheel terminating the end of the shaft D', substantially as described, and for the purpose specified.

3. The combination of the steam-cylinder, piston, and rod, cross-head and links e and f, brake-beam, lever S, arm T, and link connecting said lever to the crank-wheel, valve-rod, and valve L, constructed in the manner described, and arranged to operate and co-operate substantially as herein set forth, and for the purpose specified.

In testimony whereof I affix my signature in presence of two witnesses.

JOHN F. PANKHURST.

Witnesses:
  J. H. BURRIDGE,
  W. H. BURRIDGE.